US008368680B2

(12) United States Patent
Hsu et al.

(10) Patent No.: US 8,368,680 B2
(45) Date of Patent: Feb. 5, 2013

(54) START PROTECTION CIRCUIT FOR GATE DRIVER AND LIQUID CRYSTAL DISPLAY THEREOF

(75) Inventors: Chao-Yong Hsu, Changhua (TW); Ching-Hui Ku, Taipei County (TW); Shin-Chung Huang, Taipei County (TW); Yi-Nan Chu, Changhua County (TW); Lun-Ming Chang, Taipei County (TW); Chia-Yi Lu, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 767 days.

(21) Appl. No.: 12/569,903

(22) Filed: Sep. 30, 2009

(65) Prior Publication Data

US 2010/0328287 A1 Dec. 30, 2010

(30) Foreign Application Priority Data

Jun. 29, 2009 (TW) ............................... 98121814 A
Jun. 29, 2009 (TW) ............................... 98121815 A

(51) Int. Cl.
*G06F 3/038* (2006.01)

(52) U.S. Cl. ......... 345/211; 345/696; 345/215; 345/204

(58) Field of Classification Search ........................ None
See application file for complete search history.

(56) References Cited

U.S. PATENT DOCUMENTS

2007/0040789 A1 * 2/2007 Ha ................................. 345/98

FOREIGN PATENT DOCUMENTS

| | | |
|---|---|---|
| TW | I237229 | 8/2005 |
| TW | 200805887 | 1/2008 |

* cited by examiner

*Primary Examiner* — Muhammad N Edun

(74) *Attorney, Agent, or Firm* — Winston Hsu; Scott Margo

(57) ABSTRACT

A start protection circuit of a gate driver, which is applied in a liquid crystal display, includes a detection circuit and a switch. The detection circuit monitors a gate low voltage to generate a control signal. The switch is electrically connected to the detection circuit and controlled by the control signal, for transmitting a gate high voltage. The detection circuit outputs the gate low voltage first and monitors if the gate low voltage has reached a predetermined level. When the gate low voltage has reached the predetermined level, the detection circuit turns on the switch to output the gate high voltage.

28 Claims, 12 Drawing Sheets

START PROTECTION CIRCUIT FOR GATE DRIVER AND LIQUID CRYSTAL DISPLAY THEREOF

BACKGROUND OF THE INVENTION

1. Field of the Invention

The present invention is related to a gate driver, and more particularly, to a gate driver with a start protection circuit.

2. Description of the Prior Art

Please refer to FIG. 1. FIG. 1 is a diagram illustrating the conventional Liquid Crystal Display (LCD) device. The conventional LCD device 10 comprises a system board 12 and a display panel 16. A power source circuit 14 is disposed on the system board 12. A gate driver 18 is disposed on the display panel 16. The gate driver 18 comprises a shift register 181, a level shifter 182 and an output buffer 183. The shift register 181 receives the control signals CPV, UD, XON, OE and STV of the LCD device 10. The level shifter 182 receives the gate low voltage VEEG and the gate high voltage VDDG generated from the power source circuit, for accordingly generating the gate control signal VG. The output buffer 183 outputs the gate control signal VG to the display panel 16. The power source circuit 14 is utilized to generate the operational voltages required for the LCD device 10. The power source circuit 14 comprises a DC/DC converter 141, a charge pump 142, a first delay unit 143 and a second delay unit 144. The DC/DC converter 141 converts the power source voltage VCC to the voltage VDDA. The charge pump 142 generates the gate low voltage VEEG and the gate high voltage VDDG according to the voltage VDDA.

Please refer to FIG. 2. FIG. 2 is a timing diagram illustrating the correct power on sequence of the operational voltages when the conventional gate driver is turned on. When the LCD device 10 is booted up, the power source voltage VCC reaches a stable voltage level, then the gate low voltage VEEG reaches a low voltage level for the gate driver 18 to turn off all the scan lines to prevent the boot up noise. Afterwards the gate high voltage is activated to reach a high voltage level for driving the scan lines. Therefore, for the LCD device 10 to function properly and for preventing causing damages to the gate driver 18, the correct power on sequence of the operational voltages of the LCD device 10 is as below:

VCC->VEEG->VDDG

According to the above power on sequence, the gate low voltage VEEG and the gate high voltage VDDG are passed through the first delay unit 143 and the second delay unit 144 respectively before being transmitted to the level shifter 182, so the gate low voltage VEEG is transmitted to the gate driver 18 prior to the gate high voltage VDDG. Thus, the correct power on sequence is attained.

Please refer to FIG. 3. FIG. 3 is a timing diagram illustrating the incorrect power on sequence of the operational voltages when the conventional gate driver is turned on. Normally the gate low voltage VEEG is activated prior to the gate high voltage VDDG, for the gate driver 18 to turn off the entire scan lines; this way abnormal behaviors caused by the incorrect power on sequence when the LCD device 10 is booted up can be prevented. However, since the gate driver 18 of the conventional LCD 10 does not incorporate any detection mechanisms for monitoring the power on sequence of the operational voltages, the occurrence of incorrect power on sequence and the relative consequences cannot be effectively prevented. For instances, at the instance of when the LCD device 10 is booted up, the power source circuit 14 may transmit the gate low voltage VDDG and the gate high voltage VEEG synchronously (i.e. at the same time) to the display panel 16, the gate low voltage VEEG is likely to generate spikes due to the coupling effect of the gate high voltage VDDG, causing the gate driver 18 to function improperly. Consequently the LCD device 10 may not be able to boot up, or even the gate driver 18 may be damaged.

SUMMARY OF THE INVENTION

The prevent invention provides a start protection circuit of a gate driver. The start protection circuit of the gate driver comprises: a detection circuit, for transmitting and monitoring a gate low voltage, to generate a control signal accordingly; and a switch, electrically connected to the detection circuit, the switch is controlled by the control signal, for transmitting a gate high voltage.

The prevent invention further provides a method for protecting activating operational voltages of a gate driver. The method comprises: receiving a gate low voltage and a gate high voltage;

outputting the gate low voltage; monitoring if the gate low voltage has reached a predetermined voltage level; and when the gate low voltage has reached the predetermined voltage level, outputting the gate high voltage.

The prevent invention further provides a gate driver. The gate driver comprises: a start protection circuit, for transmitting a gate low voltage, when the gate low voltage has reached a predetermined voltage level, outputting a gate high voltage; a shift register, for receiving a display signal; a level shifter, electrically connected to the shift register, for generating a gate control signal according to the display signal, the gate low voltage and the gate high voltage; and an output buffer, electrically connected to the level shifter, for outputting the gate control signal.

The prevent invention further provides a liquid crystal display device. The liquid crystal display device comprises: a display panel; a start protection circuit, electrically connected to the display panel, for transmitting a gate low voltage, when the gate low voltage has reached a predetermined voltage level, outputting a gate high voltage; and a gate driver, electrically connected to the detection circuit, for driving the liquid crystal display panel according to the gate low voltage and the gate high voltage.

The present invention further discloses a method for activating operational voltages of a gate driver. The method comprising: receiving a gate low voltage and a gate high voltage; outputting the gate low voltage to a gate driver; by comparing the gate low voltage with a reference voltage, detecting whether the gate low voltage has reached a first predetermined voltage level, for generating a first control signal; receiving a power source voltage; by comparing the power source voltage with an input reference voltage, detecting whether the power source voltage has reached a second predetermined voltage level, for generating a second control signal; and outputting the gate high voltage to the gate driver according to the first control signal and the second control signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a timing diagram illustrating the correct power on sequence of the operational voltages when the conventional gate driver is turned on.

FIG. 3 is a timing diagram illustrating the incorrect power on sequence of the operational voltages when the conventional gate driver is turned on.

FIG. 5 is a timing diagram illustrating the power on sequence of the operational voltages of the LCD device of the present invention when the gate driver is turned on.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "electrically connect" is intended to mean either an indirect or direct electrical connection. Accordingly, if one device is coupled to another device, that connection may be through a direct electrical connection, or through an indirect electrical connection via other devices and connections.

Figure 1:
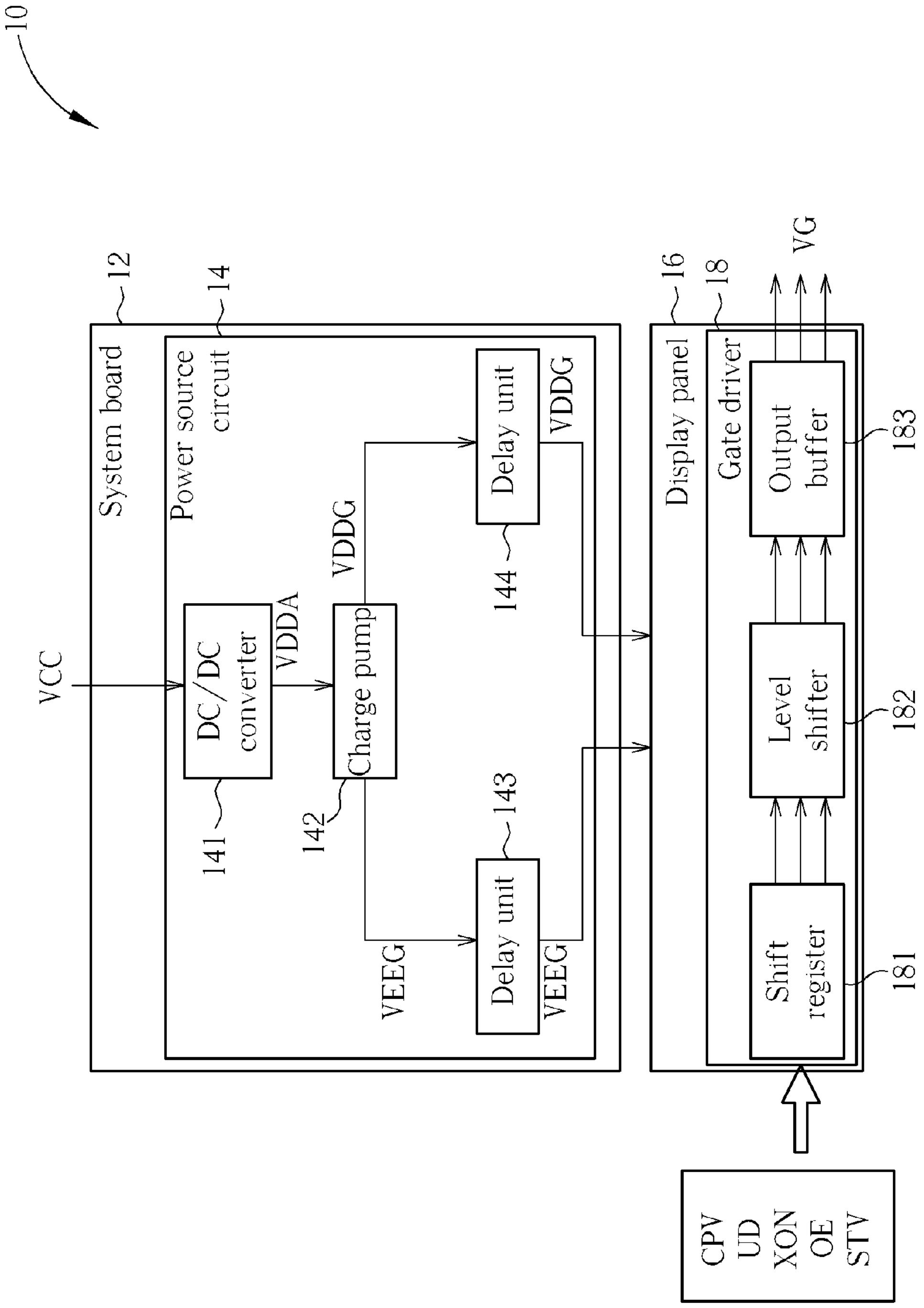
FIG. 1 PRIOR ART
FIG. 1 is a diagram illustrating the conventional Liquid Crystal Display (LCD) device.
Figure 2:
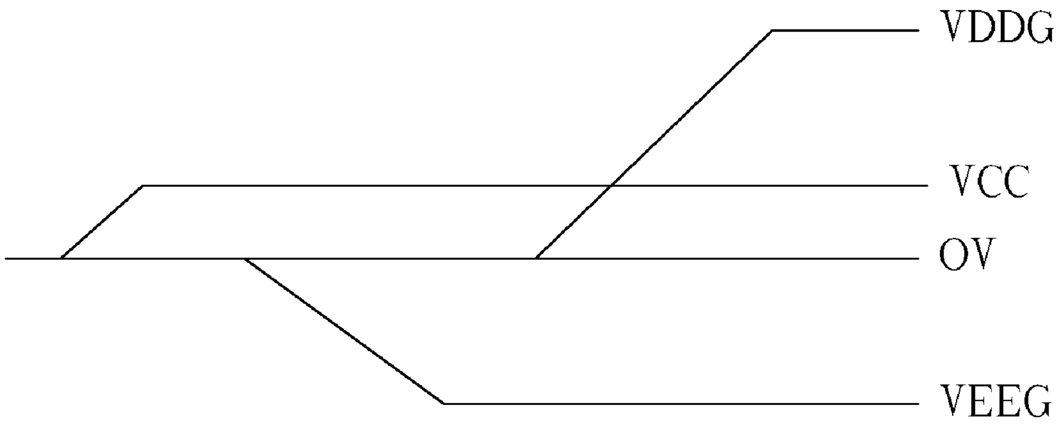
FIG. 2 PRIOR ART
Figure 3:
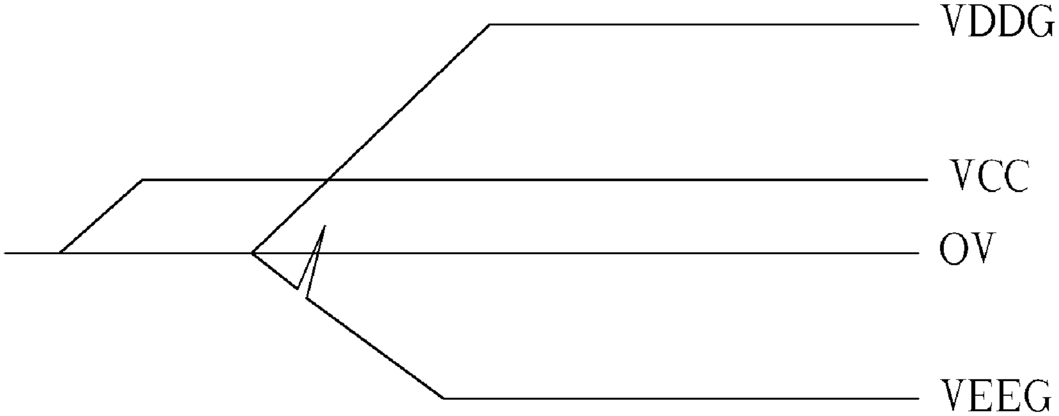
FIG. 3 PRIOR ART
Figure 4:
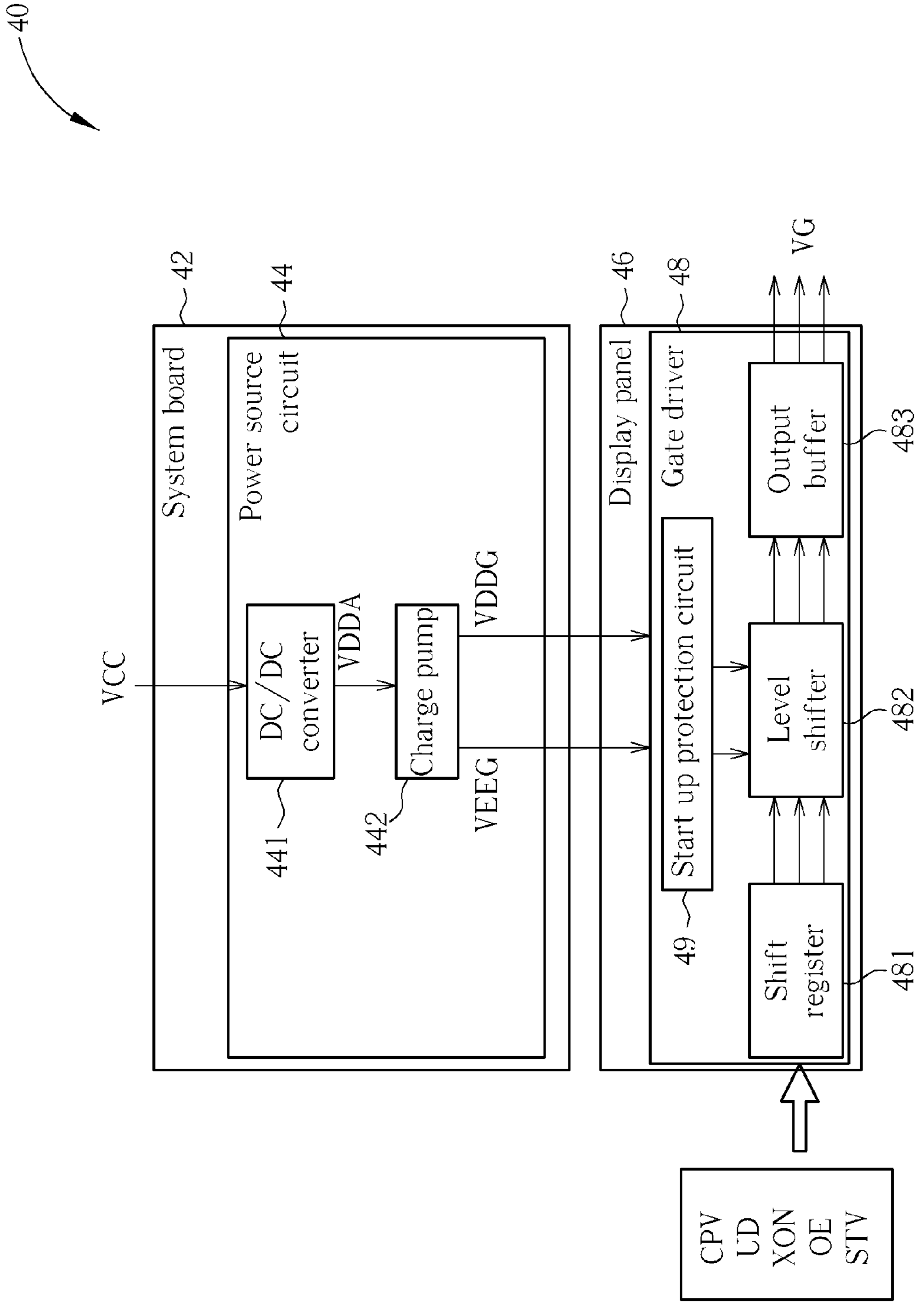
FIG. 4 is a diagram illustrating the first embodiment of the LCD device of the present invention.

Please refer to FIG. 4. FIG. 4 is a diagram illustrating the first embodiment of the LCD device of the present invention. The LCD device 40 comprises a system board 42 and a display panel 46. The power source circuit 44 is disposed on the system board 42. The gate driver 48 is disposed on the display panel 46. The gate driver 48 comprises a shift register 481, a level shifter 482, an output buffer 483 and a start protection circuit 49. The shift register 481 receives the display signals CPV, UD, XON, OE and STV. The level shifter 482 receives the gate low voltage VEEG and the gate high voltage VDDG generated from the power source circuit 44, for accordingly generating the gate control signal VG. The output buffer 483 outputs the gate control signal VG to the display panel 46. The power source circuit 44 is utilized to generate the operational voltages required for the LCD device 40. The power source circuit 44 comprises a DC/DC converter 441 and a charge pump 442. The DC/DC converter 441 converts the power source voltage VCC to the voltage VDDA. The charge pump 442 generates the gate low voltage VEEG and the gate high voltage VDDG according to the voltage VDDA. The start protection circuit 49 is able to prevent the incorrect power on sequence of the gate high voltage VDDG and the gate low voltage VEEG when the LCD device 40 is booted up, further preventing the LCD device 40 from malfunctioning or unable to boot up.

Figure 5:
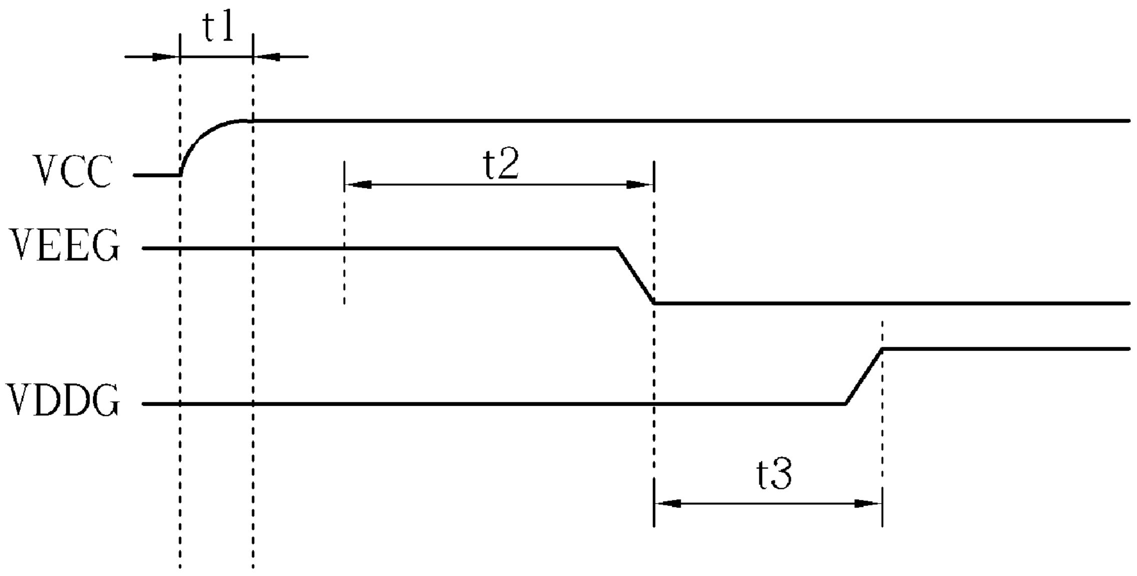

Please refer to FIG. 5. FIG. 5 is a timing diagram illustrating the power on sequence of the operational voltages of the LCD device of the present invention when the gate driver 48 is turned on. Firstly, the power source voltage VCC reaches the stable voltage level after a first duration t1, the gate low voltage VEEG then reaches a low voltage level after a second duration t2, subsequently the gate high voltage VDDG reaches a high voltage level after a third duration t3. The second duration t2 and the third duration t3 are determined according to the specification of the LCD device. In the embodiment of the present invention, the start protection circuit 49 is able to detect the voltage level of the gate low voltage VEEG; only when the gate low voltage VEEG has reached the low voltage level, the start protection circuit 49 then transmits the gate high voltage VDDG to the gate driver 48. Therefore, the incorrect power on sequence of when the gate high voltage VDDG and the gate low voltage VEEG are both transmitted to the gate driver 48 synchronously, or when the gate high voltage VDDG is transmitted to the gate driver 48 prior to the gate low voltage VEEG, can be prevented accordingly.

Figure 6:
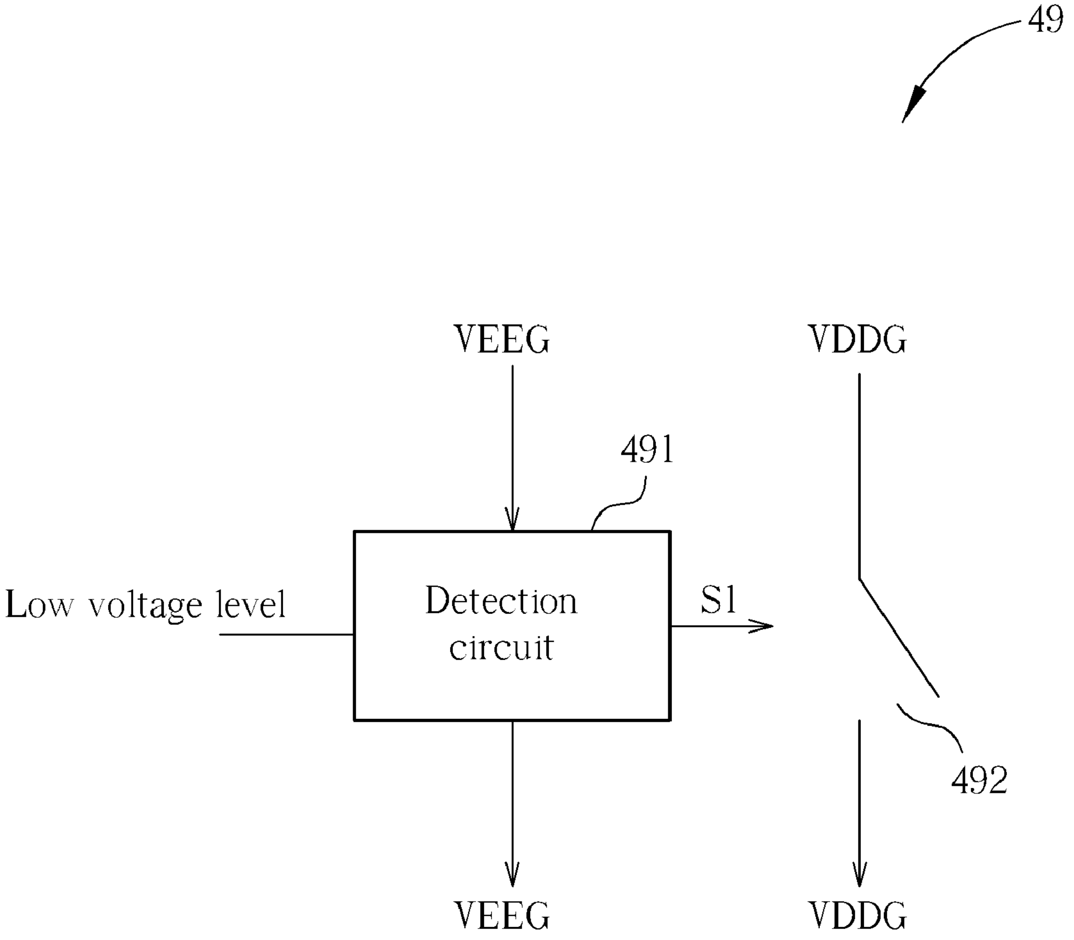
FIG. 6 is a circuit diagram illustrating the start protection circuit of the LCD device of the present invention in FIG. 4.

Please refer to FIG. 6. FIG. 6 is a circuit diagram illustrating the start protection circuit of the LCD device of the present invention in FIG. 4. The start protection circuit 49 comprises a detection circuit 491 and a switch 492. The detection circuit 491 is utilized to monitor the gate low voltage VEEG, for accordingly generating a control signal S1. The control signal S1 controls the switch 492 and the switch 492 is electrically connected to the detection circuit 491. The gate low voltage VEEG is transmitted to the gate driver 48 via the detection circuit 491 and the gate high voltage VDDG is transmitted to the gate driver 48 via the switch 492. The start protection circuit 49 ensures the correct power on sequence of the gate high voltage VDDG and the gate low voltage VEEG by monitoring if the gate low voltage VEEG has reached the low voltage level. When the gate low voltage VEEG is lower than the low voltage level (i.e. when the gate low voltage VEEG is not at the low voltage level), the detection circuit 491 outputs the control signal S1 to turns off the switch 492. When the gate low voltage VEEG has reached the low voltage level, the detection circuit 491 outputs the control signal S1 to turn on the switch 492 so that the gate high voltage VDDG can be transmitted to the gate driver 48. Therefore, the gate driver 48 is guaranteed to receive the gate low voltage VEEG of the low voltage level first before the gate driver 48 receives the gate high voltage VDDG of the high voltage level.

Figure 7:
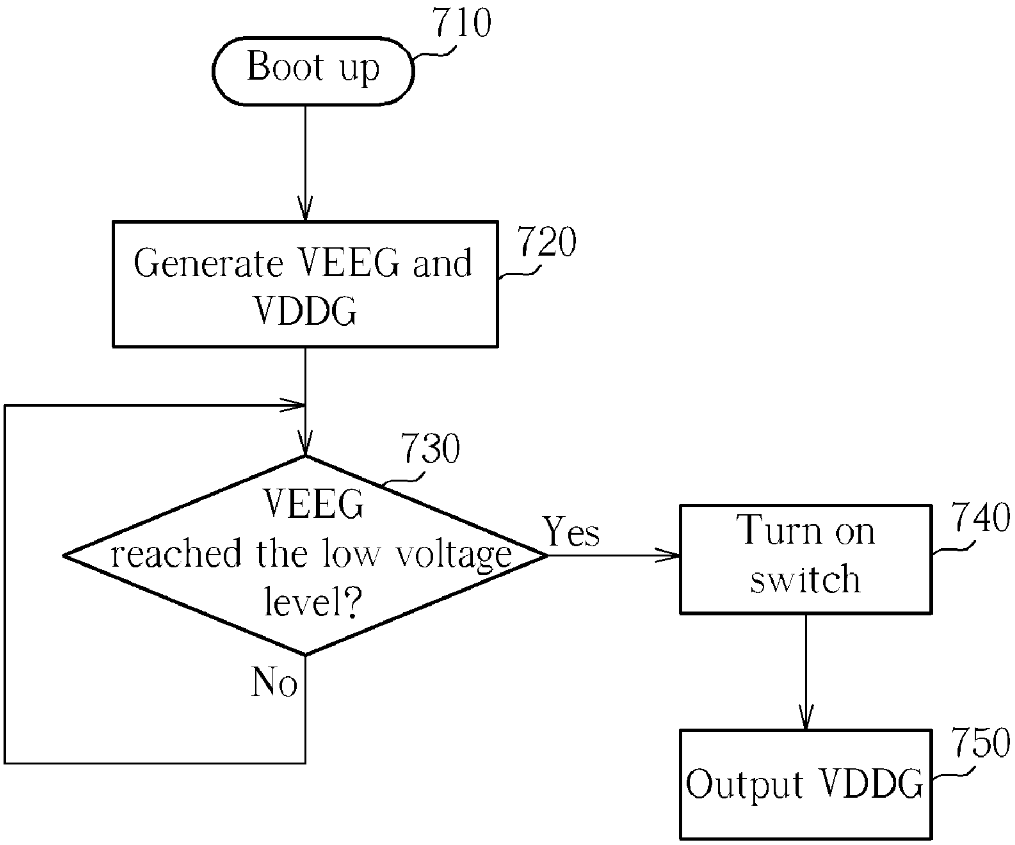
FIG. 7 is a flowchart illustrating the operational flow of the start protection circuit of the present invention as shown in FIG. 4.

Please refer to FIG. 7. FIG. 7 is a flowchart illustrating the operational flow of the start protection circuit of the present invention as shown in FIG. 4. The start protection circuit 49 operates according to the following procedures:

Step 710: Power on the LCD 40; the power source voltage VCC is inputted to the system board 42.

Step 720: The power source circuit 44 generates the gate low voltage VEEG and the gate high voltage VDDG; the detection circuit 491 transmits the gate low voltage VEEG to the gate driver 48.

Step 730: The detection circuit 491 monitors if the gate low voltage VEEG has reached the low voltage level; if yes, go to Step 740; if no, go to Step 720.

Step 740: The detection circuit 491 turns on the switch 492.

Step 750: The gate high voltage VDDG is transmitted to the gate driver 48 via the turned on switch 492.

When the LCD 40 is powered on, the power source circuit 44 utilizes the charge pump 442 to generate the gate low voltage VEEG and the gate high voltage VDDG. The detection circuit then transmits the gate low voltage VEEG to the gate driver 48 and continues to monitor if the gate low voltage VEEG has reached the low voltage level, and the control signal S1 is generated accordingly. When the gate low voltage VEEG has reached the low voltage level, the detection circuit 491 outputs the control signal S1 which turns on the switch 492. When the switch 492 is turned on the gate high voltage VDDG can then be transmitted to the gate driver 48 via the switch 492. Additionally, according to the regulation of the power on sequence of the operational voltages, the gate high voltage VDDG is intended to reach the high voltage level following a predetermined duration after the gate low voltage VEEG has reached the low voltage level. Therefore, in the embodiment of the present invention, the control signal S1 can also be utilized to delay the output of the gate high voltage VDDG, so the power on sequence of the gate low voltage VEEG and the gate high voltage VDDG conforms to the regulation.

Figure 8:
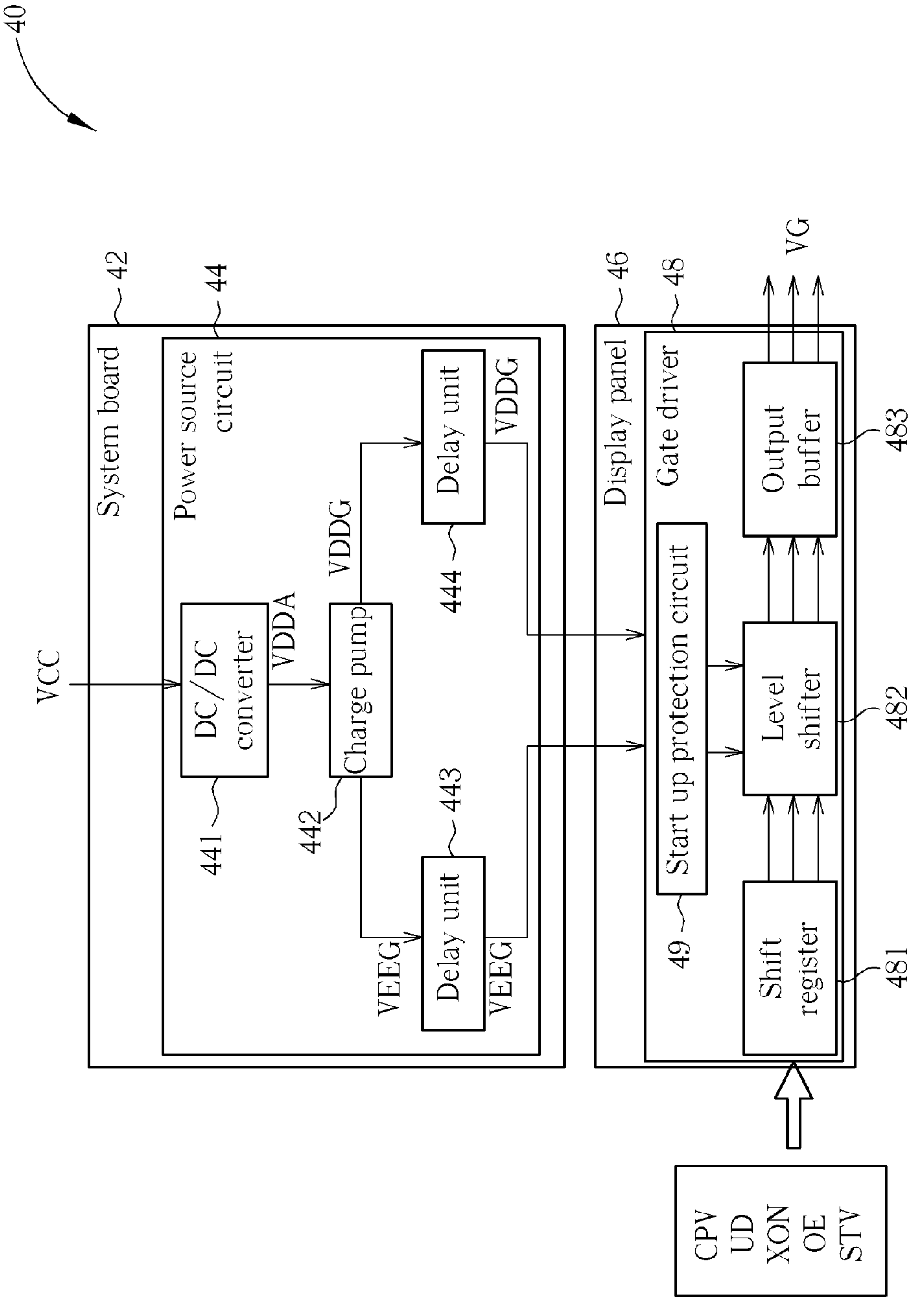
FIG. 8 is a diagram illustrating the second embodiment of the present invention.

Please refer to FIG. 8. FIG. 8 is a diagram illustrating the second embodiment of the present invention. In the second embodiment, the power source circuit 44 further comprises a first delay unit 443 and a second delay unit 444. Therefore, the gate low voltage VEEG and the gate high voltage VDDG pass through the first delay unit 443 and the second delay unit 444 respectively before being transmitted to the gate driver 48. This way, the gate low voltage VEEG and the gate high voltage VDDG are transmitted to the gate driver 48 sequentially, so the correct power on sequence is achieved. However, the first delay unit 443 and the second delay unit 444 do not incorporate a mechanism that monitors the power on sequence of the gate low voltage VEEG and the gate high voltage VDDG, so the correct power on sequence is not guaranteed. Therefore, the start protection circuit 49 of the present invention is also suitable for the power source circuit 44 which comprises delay units.

Figure 9:
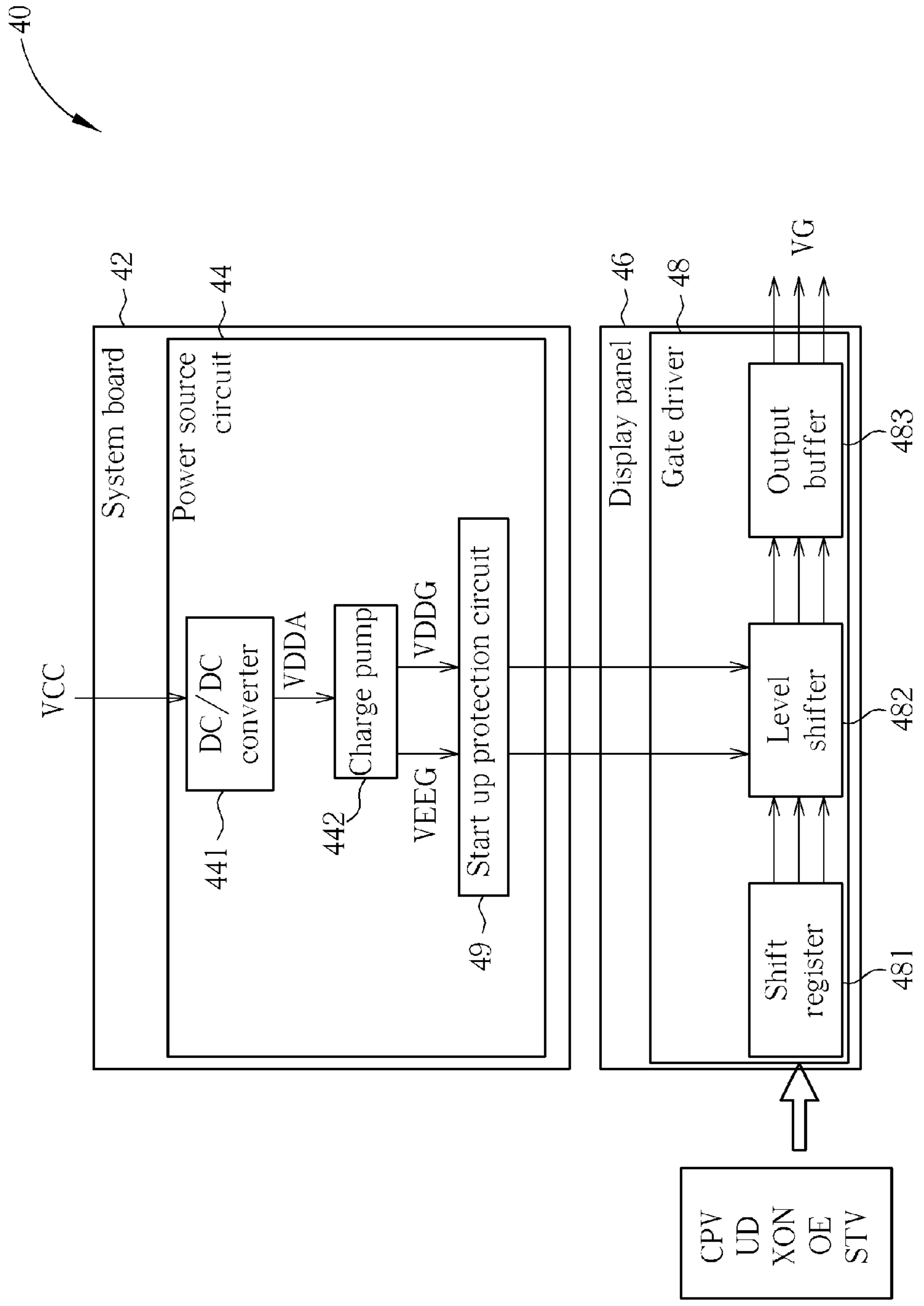
FIG. 9 is a diagram illustrating the third embodiment of the present invention.

Please refer to FIG. 9. FIG. 9 is a diagram illustrating the third embodiment of the present invention. The circuit structure of the third embodiment of the present invention is similar to that of the first embodiment illustrated in FIG. 4; the difference is that for the third embodiment of the present invention, the start protection circuit 49 is disposed in the power source circuit 44. This way, the gate low voltage VEEG and the gate high voltage VDDG enter the start protection circuit 49 before being transmitted to the gate driver 48. As a result the gate low voltage VEEG is transmitted to the gate driver 48 prior to the gate high voltage VDDG that is in compliance with the correct power on sequence. Therefore, by disposing the start protection circuit 49 in the power source circuit 44 can ensure the gate low voltage VEEG and the gate high voltage VDDG of the correct power on sequence are generated by the power source circuit 44.

Figure 10:
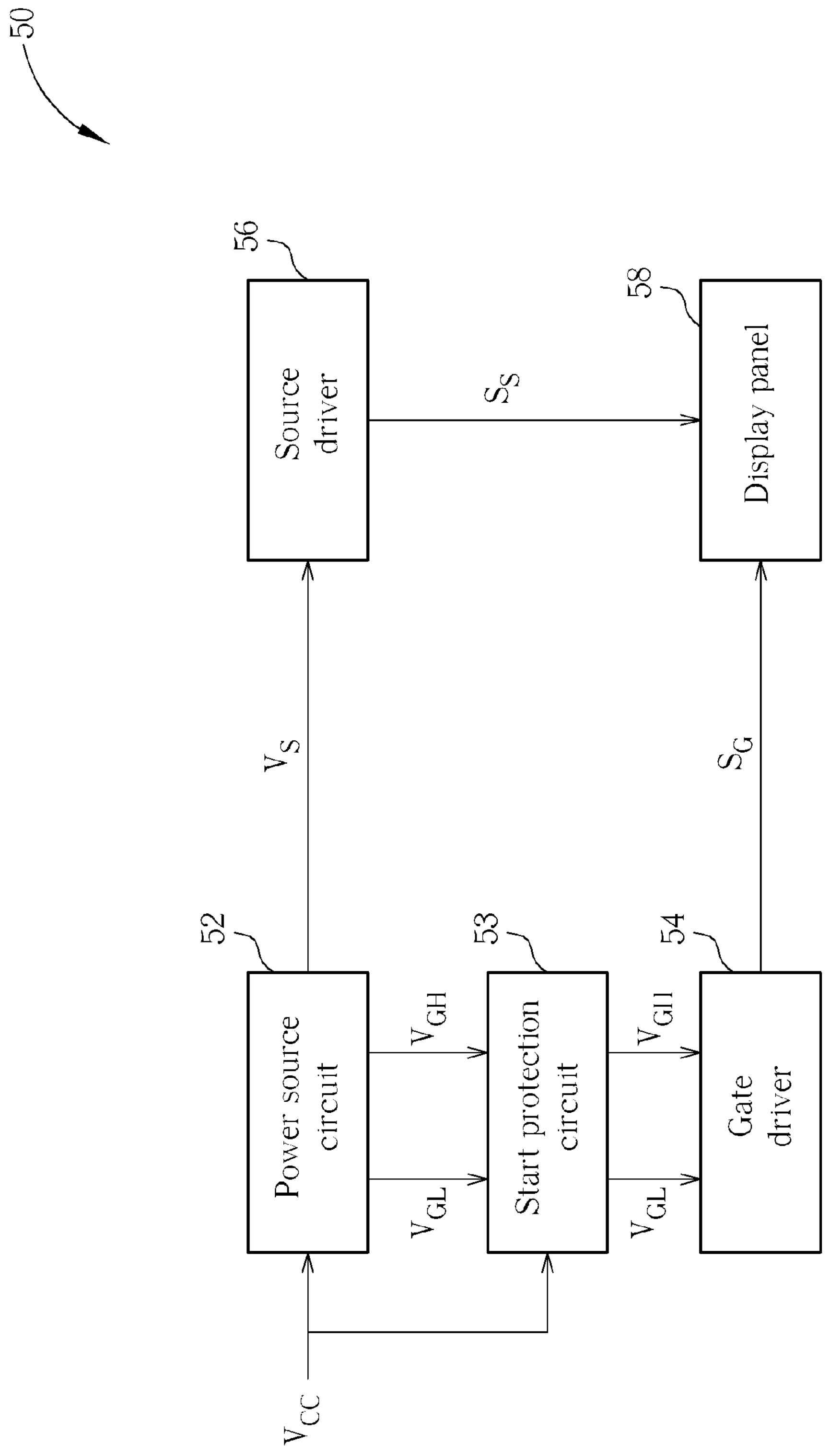
FIG. 10 is a diagram illustrating the fourth embodiment of the LCD device of the present invention.

Please refer to FIG. 10. FIG. 10 is a diagram illustrating the fourth embodiment of the LCD device of the present invention. The LCD device 50 comprises a power source circuit 52, a gate driver 54, a start protection circuit 53, a source driver 56 and a display panel 58. When the LCD device 50 is turned on, the power source circuit 52 receives the power source voltage VCC, for accordingly generating the data driving voltage VS, the gate low voltage VEEG and the gate high voltage VDDG. The start protection circuit 53 receives the power source voltage VCC and is electrically connected between the power source circuit 52 and the gate driver 54. The start protection circuit 53 is utilized to ensure the correct sequence of the gate low voltage VEEG and the gate high voltage VDDG. The gate driver 54 is utilized to receive the gate low voltage VEEG and the gate high voltage VDDG of the correct sequence from the start protection circuit 53, for generating a gate control signal SG accordingly. The source driver 56 is electrically connected to the power source circuit 52, for receiving the data driving voltage VS for generating the data driving signal SS. The display panel 58 is electrically connected to both of the gate driver 54 and the source driver 56. The display panel 58 displays frames according to the gate control signal SG and the data driving signal SS.

Figure 11:
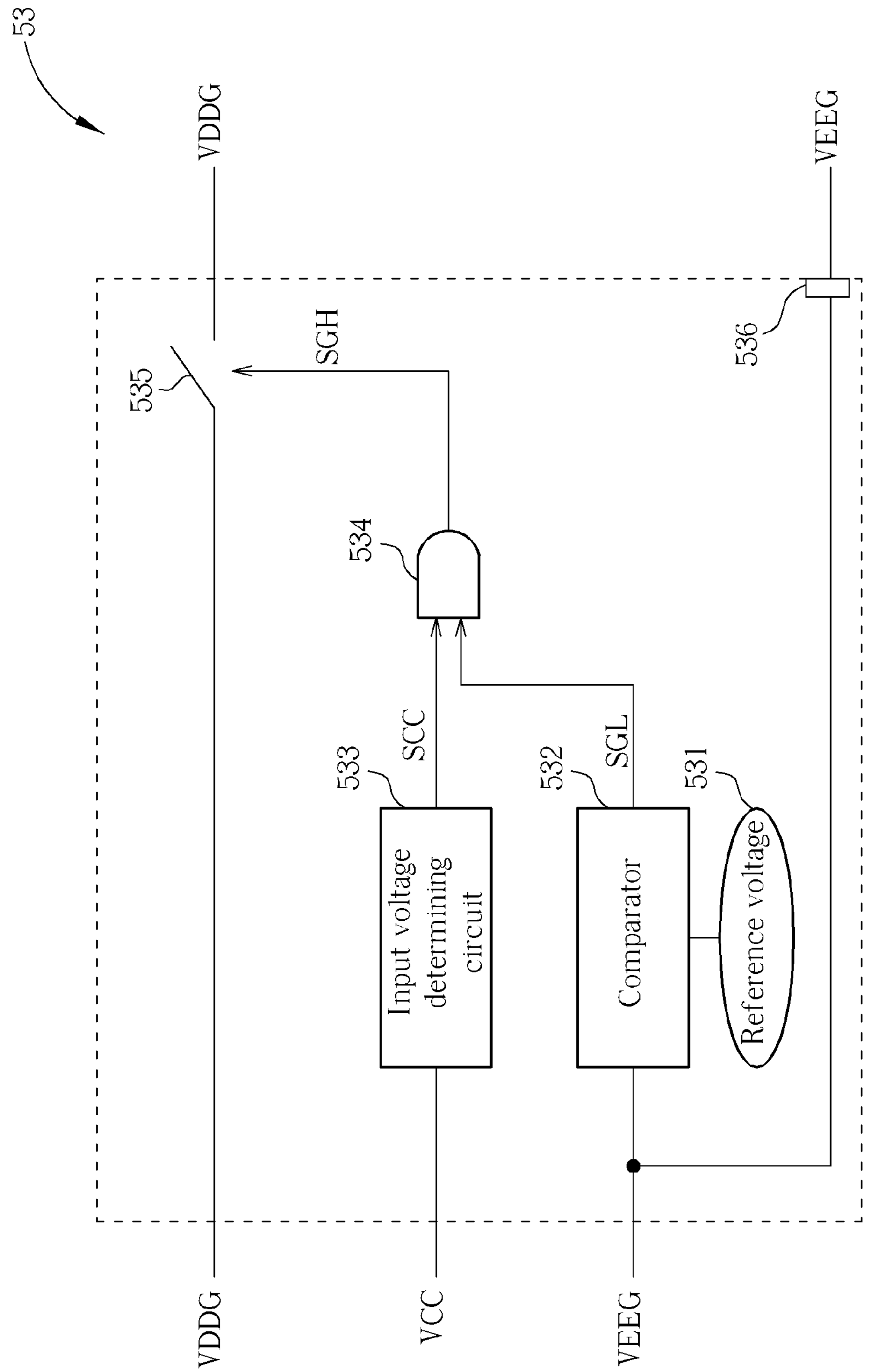
FIG. 11 is a diagram illustrating the fourth embodiment of the start protection circuit of the present invention.

Please refer to FIG. 11. FIG. 11 is a circuit diagram illustrating the start protection circuit 53 of the LCD device of present invention. In the present embodiment, the start protection circuit 53 comprises a reference voltage source 531, a comparator 532, an input voltage determining circuit 533, an AND gate 534, a switch 535, and a gate low voltage output end 536. The reference voltage source 531 is utilized to provide a reference voltage of a negative voltage level that is close to 0 volt, for example, −0.5 volt (V). The comparator 532 comprises a first input end, a second input end and an output end. The gate low voltage VEEG is transmitted to the first input end of the comparator 532, and at the same time, to the level shifter 482 via the gate low voltage output end 536. The reference voltage source 531 outputs the reference voltage to the second input end of the comparator 534. The comparator 532 is utilized to compare the voltage levels of the reference voltage and the gate low voltage VEEG, for generating a gate low voltage determining signal SGL accordingly. For instances, when the gate low voltage VEEG is 0V, the voltage level of the gate low voltage VEEG is higher than that of the reference voltage (−0.5 V), so the comparator 532 outputs the gate low voltage determining signal SGL of logic "0" (i.e. low voltage level); when the gate low voltage VEEG is declined to −6 V, the voltage level of the gate low voltage VGL is lower than that of the reference voltage, so the comparator 532 outputs the gate low voltage VEEG of logic "1" (i.e. high voltage level).

The input voltage determining circuit 533 is utilized to receive the power source voltage VCC, for outputting an input voltage determining signal SCC according to an input reference voltage. For instances, assuming the voltage level of the input reference voltage is 2V, when the voltage level of the power source voltage VCC is 0V (i.e. lower than the input reference voltage), the input voltage determining circuit 533 outputs the input voltage determining signal SCC of logic "0" (i.e. low voltage level); when the power source voltage VCC is 5V (i.e. higher than the input reference voltage), the input voltage determining circuit 533 outputs the input voltage determining signal SCC of logic "1" (i.e. high voltage level). The first input end of the AND gate 534 is electrically connected to the input voltage determining circuit 533 for receiving the input voltage determining signal SCC; the second input end of the AND gate 534 is electrically connected to the output end of the comparator 532, for receiving the gate low voltage determining signal SGL. The AND gate 534 performs logic operation of "AND" to the input voltage determining signal SCC and the gate low voltage determining signal SGL, for outputting a gate high voltage determining signal SGH accordingly. For instance, when the input voltage determining signal SCC and the gate low voltage determining signal SGL are both logic "1" (i.e. high voltage level), the AND gate 534 outputs the gate high voltage determining signal SGH of logic "1" (i.e. high voltage level).

The switch 535 is utilized to the gate high voltage VDDG. The switch 535 is electrically connected to the output end of the AND gate 534. The switch 535 is controlled by the gate high voltage determining signal SGH outputted by the AND gate 496. For instances, when the gate high voltage determining signal SGH is logic "0" (i.e. low voltage level), the switch 535 is turned off; when the gate high voltage determining signal SGH is logic "1" (i.e. high voltage level), the switch 535 is turned on. When the switch 535 is turned on, the gate high voltage VDDG can then be transmitted to the level shifter 482 via the switch 535.

In other words, only when the switch 535 is turned on, the gate high voltage VDDG is able to be transmitted to the level shifter 482 via the switch 535; only when the gate high voltage determining signal SGH is logic "1" (i.e. high voltage level), the switch 535 is turned on; only when the input voltage determining signal SCC and the gate low voltage determining signal SGL are both logic "1" (i.e. high voltage level), the AND gate 496 outputs the gate high voltage determining signal SGH of logic "1" (i.e. high voltage level); only when voltage level of the gate low voltage VEEG has declined to a low level (e.g. −6V), the comparator 532 outputs the gate low voltage determining signal SGL of logic "1". Therefore, through the protection of the start protection circuit 53, the level shifter will receive the gate low voltage VEEG of the low voltage level first, before receiving the gate high voltage VGH of the high voltage level.

Figure 12:
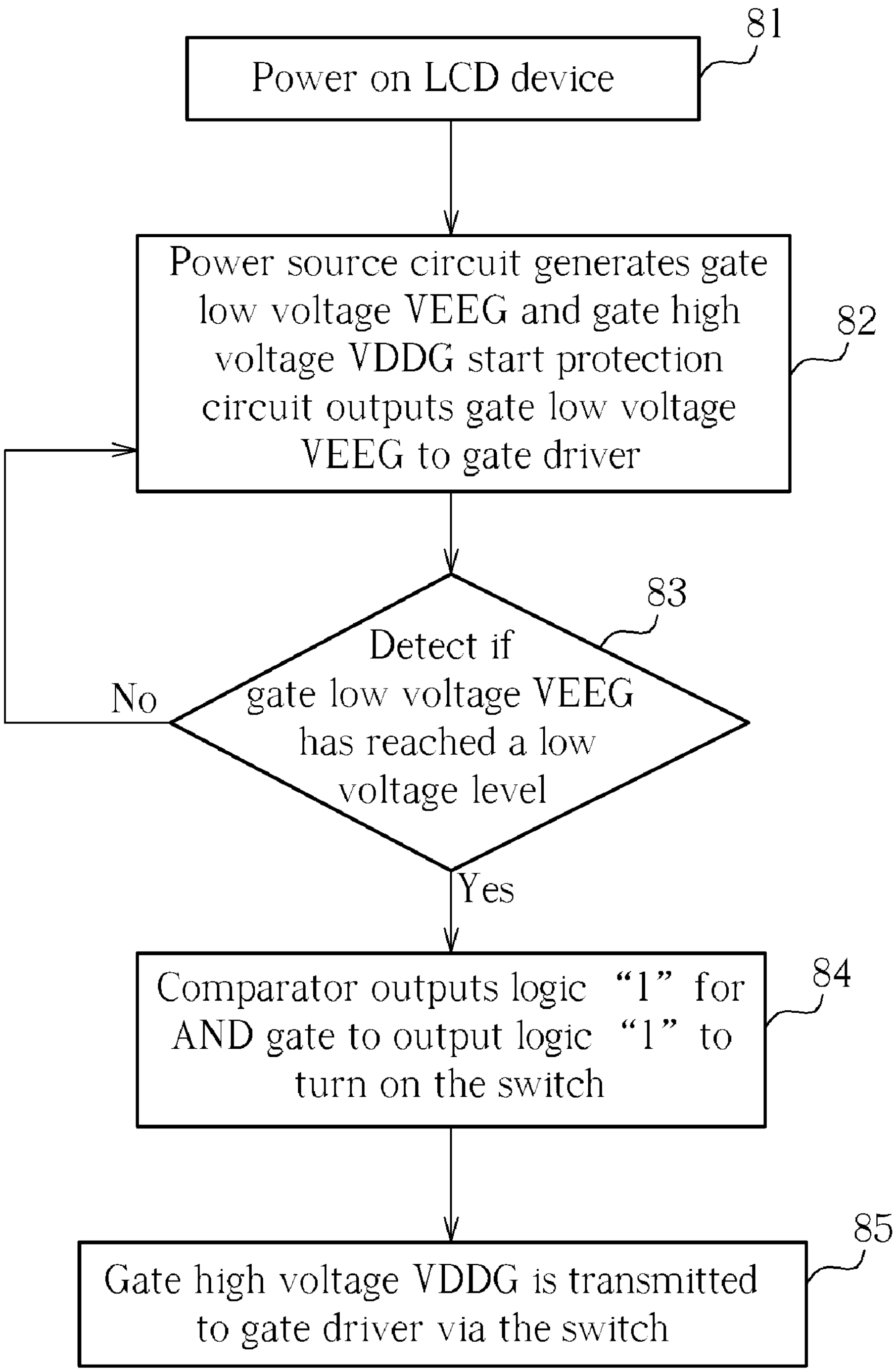
FIG. 12 is a flowchart illustrating the operational flow according to the start protection circuit in FIG. 10 and FIG. 11 of the present invention.

Please refer to FIG. 12. FIG. 12 is a flowchart illustrating the operational flow according to the start protection circuit 53 in FIG. 10 and FIG. 11 of the present invention. The operational flow of the start protection circuit 53 comprises the following steps:

Step 81: Power on the LCD device 50, the power source voltage VCC is transmitted to the power source circuit 52 and the input voltage determining circuit 533;

Step 82: The power source circuit 52 generates the gate low voltage VEEG and the gate high voltage VDDG; the start protection circuit 53 outputs the gate low voltage VEEG to the gate driver 54 via the gate low voltage output end 536.

Step 83: The comparator 532 detects if the gate low voltage VEEG has reached a low voltage level by comparing the gate low voltage to the reference voltage 531; if yes, proceed to Step 83; else, go back to Step 82.

Step 84: The comparator 532 outputs logic "1" (i.e. high voltage level) for the AND gate 534 to output logic "1" (i.e. high voltage level), to turn on the switch 535.

Step 85: The gate high voltage VDDG is transmitted to the gate driver 54 via the switch 535.

When the LCD device 50 is turned on, the power source voltage VCC is transmitted to the power source circuit 52 and the input voltage determining circuit 533. The input voltage determining circuit 533 generates an input voltage determining signal SCC according to the voltage level of the power source voltage VCC. The power source circuit 52 generates the gate low voltage VEEG and the gate high voltage VDDG according to the power source voltage VCC. The gate low voltage VEEG and the gate high voltage VDDG are transmitted to the comparator 532 of the start protection circuit 53 and the switch 535 respectively. The start protection circuit 53 then transmits the gate low voltage VEEG to the gate driver 54 via the gate low voltage output end 536. The comparator 532 detects whether the gate low voltage VEEG has reached a low voltage level, according to the reference voltage 531. When the gate low voltage VEEG has reached the low voltage level, the comparator 532 outputs the gate low voltage determining signal SGL of logic "1" (i.e. high voltage level). The AND gate 534 performs logic "AND" operation to the input voltage determining signal SCC and the gate low voltage determining signal SGL. When the input voltage determining signal SCC and the gate low voltage determining signal SGL are both logic "1" (i.e. high voltage level), the AND gate 534 outputs the gate high voltage determining signal SGH of logic "1" (i.e. high voltage level). When the gate high voltage determining signal SGH is of logic "1" (i.e. high voltage level), the switch 535 is turned on, so the gate high voltage VDDG is transmitted to the gate driver 54 via the switch 535. By utilizing the gate high voltage determining signal SGH to delay outputting the gate high voltage VDDG to the gate driver 54, the start protection circuit 50 of the present invention is able to control the sequence of the gate low voltage VEEG and the gate high voltage VDDG to be compliant to the regulation.

In conclusion, the start protection circuit of the gate driver of the present invention comprises a detection circuit and a switch. The detection circuit is utilized to monitor the gate low voltage, for generating a control signal. The switch is electrically connected to the detection circuit and is controlled by the control signal, for transmitting a gate high voltage. The detection circuit firstly outputs the gate low voltage and monitors if the gate low voltage has reached a predetermined voltage level. When the gate low voltage has reached the predetermined voltage level, the detection circuit turns on the switch for transmitting the gate high voltage.

Those skilled in the art will readily observe that numerous modifications and alterations of the device and method may be made while retaining the teachings of the invention.

What is claimed is:

1. A start protection circuit of a gate driver, comprising:
a detection circuit, for transmitting and monitoring a gate low voltage, to generate a control signal accordingly; and
a switch, electrically connected to the detection circuit, the switch is controlled by the control signal, for transmitting a gate high voltage;
wherein the detection circuit is electrically connected to a charge pump, for receiving the gate low voltage generated by the charge pump; the switch is electrically connected to the charge pump, for receiving the gate high voltage generated by the charge pump.

2. The start protection circuit of the gate driver of claim 1, wherein the detection circuit is utilized to monitor if the gate low voltage has reached a predetermined voltage level.

3. The start protection circuit of the gate driver of claim 1, wherein the switch is turned on when the gate low voltage has reached the predetermined voltage level.

4. The start protection circuit of the gate driver of claim 1, wherein the detection circuit is electrically connected to the charge pump via a first delay unit; the switch is electrically connected to the charge pump via a second delay unit.

5. The start protection circuit of the gate driver of claim 1, wherein the detection circuit is electrically connected to a level shifter, for transmitting the gate low voltage to the level shifter; the switch is electrically connected to the level shifter, for transmitting the gate high voltage to the level shifter.

6. A method for protecting activating operational voltages of a gate driver, comprising:
receiving a gate low voltage and a gate high voltage;
outputting the gate low voltage;
monitoring if the gate low voltage has reached a predetermined voltage level; and
when the gate low voltage has reached the predetermined voltage level, outputting the gate high voltage.

7. The method of claim 6, wherein when the gate low voltage has reached the predetermined voltage level, outputting the gate high voltage is to output the gate high voltage after a predetermined duration when the gate low voltage has reached the predetermined voltage level.

8. The method of claim 6, further comprising:
providing a power source voltage; and
generating the gate low voltage and the gate high voltage according to the power source voltage.

9. The method of claim 6, further comprising:
transmitting the gate low voltage and the gate high voltage to the gate driver.

10. A gate driver, comprising:

a start protection circuit, for transmitting a gate low voltage, when the gate low voltage has reached a predetermined voltage level, outputting a gate high voltage, the start protection circuit comprising:

a detection circuit, for transmitting and monitoring if the gate low voltage has reached the predetermined voltage level, for generating a control signal; and a switch, electrically connected to the detection circuit, the switch is controlled by the control signal, for transmitting the gate high voltage, wherein the detection circuit is electrically connected to a charge pump, for receiving the gate low voltage generated by the charge pump; the switch is electrically connected to the charge pump, for receiving the gate high voltage generated by the charge pump;

a shift register, for receiving a display signal;

a level shifter, electrically connected to the shift register, for generating a gate control signal according to the display signal, the gate low voltage and the gate high voltage; and an output buffer, electrically connected to the level shifter, for outputting the gate control signal.

11. The gate driver of claim 10, wherein the switch is turned on when the gate low voltage has reached the predetermined voltage level.

12. The gate driver of claim 10, wherein the detection circuit is electrically connected to the charge pump via a first delay unit; the switch is electrically connected to the charge pump via a second delay unit.

13. A liquid crystal display device, comprising:

a display panel;

a charge pump, for generating a gate low voltage and a gate high voltage;

a start protection circuit, electrically connected to the display panel, for transmitting the gate low voltage, when the gate low voltage has reached a predetermined voltage level, outputting the gate high voltage; and a gate driver, electrically connected to the detection circuit, for driving the liquid crystal display panel according to the gate low voltage and the gate high voltage.

14. The liquid crystal display device of claim 13, wherein the start protection circuit comprises:

a detection circuit, for transmitting and monitoring if the gate low voltage has reached the predetermined voltage level to generate a control signal accordingly; and a switch, electrically connected to the detection circuit, the switch is controlled by the control signal, for transmitting the gate high voltage.

15. The liquid crystal display device of claim 14, wherein the switch is turned on when the gate low voltage has reached the predetermined voltage level.

16. A start protection circuit of a gate driver, comprising:

a comparator, for detecting if a gate low voltage has reached a predetermined voltage level, comprising:

a first input end, for receiving the gate low voltage;

a second input end, for receiving a reference voltage; and an output end, for outputting a gate low voltage determining signal according to a result of comparing voltage levels of the gate low voltage and the reference voltage;

an input voltage determining circuit, for receiving an power source voltage and generating an input voltage determining signal according to an input reference voltage;

a logic gate, comprising:

a first input end, electrically connected to the input voltage determining circuit, for receiving the input voltage determining signal;

a second input end, electrically connected to the comparator, for receiving the gate low voltage determining signal; and an output end, the logic gate performing a logic operation according to the input voltage determining signal and the gate low voltage determining signal, for outputting a gate high voltage determining signal from the output end of the logic gate;

a switch, electrically connected to the logic gate; and a gate low voltage output end, for receiving the gate low voltage and transmitting the gate low voltage to a level shifter.

17. The start protection circuit of claim 16, wherein the reference voltage is a negative voltage level.

18. The start protection circuit of claim 17, wherein when the gate low voltage is lower than the reference voltage, the comparator outputs the gate low voltage determining signal representing a first logic.

19. The start protection circuit of claim 18, wherein when the power source voltage is higher than the input reference voltage, the input voltage determining circuit outputs the input voltage determining signal representing the first logic.

20. The start protection circuit of claim 19, wherein the logic gate is an AND gate for performing an AND operation.

21. The start protection circuit of claim 20, wherein when the input voltage determining signal and the gate low voltage determining signal are both representing the first logic, the gate high voltage determining signal is representing the first logic.

22. The start protection circuit of claim 21, wherein when the gate high voltage determining signal is representing the first logic, the switch is turned on; when the gate high voltage determining signal is not representing the first logic, the switch is turned off.

23. The start protection circuit of claim 22, wherein when the switch is turned on, a gate high voltage is transmitted to the level shifter via the switch.

24. A method for activating operational voltages of a gate driver, comprising:

receiving a gate low voltage and a gate high voltage;

outputting the gate low voltage to a gate driver;

by comparing the gate low voltage with a reference voltage, detecting whether the gate low voltage has reached a first predetermined voltage level, for generating a first control signal;

receiving a power source voltage;

by comparing the power source voltage with an input reference voltage, detecting whether the power source voltage has reached a second predetermined voltage level, for generating a second control signal; and outputting the gate high voltage to the gate driver according to the first control signal and the second control signal.

25. The method of claim 24, further comprising:

providing the power source voltage; and generating the gate low voltage and the gate high voltage according to the power source voltage.

26. The method of claim 25, wherein when the gate low voltage has reached the first predetermined voltage level, the first control signal is of a first logic.

27. The method of claim 26, wherein when the power source voltage has reached the second predetermined voltage level, the second control signal is of the first logic.

28. The method of claim 27, wherein when the first control signal and the second control signal are both of the first logic, outputting the gate high voltage to the gate driver.

* * * * *